US007665872B2

(12) United States Patent
Nakabayashi

(10) Patent No.: US 7,665,872 B2
(45) Date of Patent: Feb. 23, 2010

(54) VEHICLE HEADLAMP

(75) Inventor: Masaaki Nakabayashi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 11/698,537

(22) Filed: Jan. 26, 2007

(65) Prior Publication Data

US 2007/0177401 A1 Aug. 2, 2007

(30) Foreign Application Priority Data

Jan. 31, 2006 (JP) ............................ 2006-023698

(51) Int. Cl.
*B60Q 1/00* (2006.01)
*F21V 19/00* (2006.01)
*F21S 8/00* (2006.01)

(52) U.S. Cl. ...................... 362/545; 362/538; 362/548; 362/519

(58) Field of Classification Search ................. 362/516, 362/519, 538, 543–549, 328
See application file for complete search history.

(56) References Cited

U.S. PATENT DOCUMENTS

| | | | | |
|---|---|---|---|---|
| 4,825,344 | A * | 4/1989 | Ichihara et al. | 362/518 |
| 6,923,555 | B2 * | 8/2005 | Byggmastar | 362/651 |
| 7,114,837 | B2 * | 10/2006 | Yagi et al. | 362/523 |
| 7,237,935 | B2 * | 7/2007 | Ito et al. | 362/547 |
| 7,290,913 | B2 * | 11/2007 | Watanabe et al. | 362/545 |
| 2005/0094413 | A1 * | 5/2005 | Sazuka et al. | 362/544 |
| 2005/0122735 | A1 * | 6/2005 | Watanabe et al. | 362/539 |
| 2005/0180157 | A1 * | 8/2005 | Watanabe et al. | 362/543 |
| 2006/0044840 | A1 * | 3/2006 | Watanabe et al. | 362/647 |
| 2006/0239021 | A1 * | 10/2006 | Inaba | 362/538 |

FOREIGN PATENT DOCUMENTS

JP 2005-209538 8/2005

OTHER PUBLICATIONS

English Abstract of JP2005209538 published on Aug. 4, 2005, Data supplied from the esp@cenet database, 1 page.

* cited by examiner

*Primary Examiner*—Ismael Negron
*Assistant Examiner*—David R Crowe
(74) *Attorney, Agent, or Firm*—Osha • Liang LLP

(57) ABSTRACT

A first LED unit, a first reflector, a second LED unit, a second reflector, and a light source mount which supports the first LED unit and the second LED unit are provided in a light chamber. The first reflector is formed integrally with a projection lens and forwardly reflects direct light outputted from a first LED to the central axis of the lens. The second reflector is formed integrally with the projection lens and forwardly reflects direct light outputted from a second LED. The light source mount has a fixing portion adapted to perform the positioning of the projection lens, the first reflector and the second reflector, which are formed integrally with a connecting member, in the direction of the central axis of the lens. The light source mount also has a positioning projection and positioning recesses, which are adapted to perform the positioning of the projection lens, the first reflector and the second reflector in a direction perpendicular to the central axis.

16 Claims, 11 Drawing Sheets

VEHICLE HEADLAMP

CROSS-REFERENCE TO RELATED APPLICATIONS

The present invention claims priority from Japanese patent application no. 2006-023698 filed on Jan. 31, 2006, the entire content of which is incorporated herein by reference.

BACKGROUND OF INVENTION

1. Field of the Invention

The present invention relates to a vehicle headlamp employing a semiconductor light emitting device as a light source.

2. Background Art

Light fittings, such as vehicle headlamps, sometimes need, for safety reasons, to form a light distribution pattern with high precision. The light distribution pattern is formed by an optical system employing, for example, a reflecting mirror or a lens.

In recent years, there has been proposed a vehicle headlamp (or light fitting) which employs a semiconductor light emitting element, such as a light emitting diode (LED), as a light source, and which is enabled to form a light distribution pattern that has a desired pattern shape and that provides a desired luminosity distribution (see, e.g., JP-A-2005-209538).

For example, as shown in FIG. 14, a light source unit 100 has an LED module 101, in which a light emitting diode device 102 serving as the light emitting element is mounted on a radiating board 103, and an LED mount 105 on which an LED module 101 is placed. The LED mount 105 regulates the lateral position and the rearward position of the LED module 101. The light source unit 100 also has a clip 107 which fixes the LED module 101 to the LED mount 105, a reflector 110 which reflects light emitted from the light emitting diode device 102 to the front of the light fitting, a lens 120 which projects light reflected by the reflector 110 to the front of the light fitting, and screws 130 with which the reflector 110 and the lens 120 are clamped together to the LED mount 105.

The reflector 110 is a substantially dome-like member fixed above the light emitting diode device 102. The reflector 110 has a substantially ellipsoidal reflecting surface, whose central axis is the optical axis of the light source unit 100, on the inner side thereof. With such a shape, the reflector 110 reflects light emitted from the light emitting diode device 102 to the front of a light fitting so that the reflected light converges to the optical axis of the lens 120.

The lens 120 includes a shade 122 provided at the side of the LED module 101. The shade 122 blocks or reflects a part of the light reflected by the reflector 110 to thereby cause light rays, which form the light distribution pattern of the light source unit 100, to be incident on a lens portion.

Meanwhile, the semiconductor light emitting element to be used as a light source for the vehicular headlamp is small. Thus, the light emitting region of the semiconductor light emitting element is narrow, as compared with those of conventional light sources. Accordingly, it is necessary for forming the light distribution pattern with high precision to assure the relative position of the light source with respect to the optical system with higher precision, as compared with the conventional case.

Thus, when the flat, plate-like heat radiating board 103, to which the light emitting diode device 102 is fixed, is fixed to the LED mount 105, a positioning projection 103*e* is provided on the heat radiating board 103 and is made to abut against an abutment portion 105*a* formed in the LED mount 105. Consequently, the heat radiating board 103 is positioned at the abutment portion 105*a* of the LED mount 105 with good precision in the horizontal direction.

Additionally, an assembling reference surface 106, which is used for determining the positions of the reflector 110 and the lens 120 with good precision in the direction of the optical axis, and a positioning projection 106*a*, which projects from a corresponding one of the assembling reference surfaces 106 substantially perpendicularly thereto, are provided at each of the front end portions of the LED mount 105. Each of the positioning projections 106*a* is engaged with a corresponding one of each of the positioning holes 110*a* and 122*a* respectively formed in the reflector 110 and the lens 120. Thus, the positions of the reflector 110 and the lens 120 in a direction perpendicular to the optical axis are determined with good precision.

However, even in the case of positioning the reflector 110 and the lens 120 using the assembling reference surface 106 and the positioning projection 106*a* provided at each of the front end portions of the LED mount 105 in the conventional light source unit 100, it is difficult for forming a high-precision light distribution pattern to assure sufficient relative position precision. Thus, high part precision and high assembling precision are required. The related vehicle headlamp has a problem that in the case of employing a semiconductor light emitting diode device 102 as a light source for a vehicle headlamp, the manufacturing cost thereof is increased.

SUMMARY OF INVENTION

One or more embodiments of the present invention provide an excellent vehicle headlamp that can assure, even in the case of using a semiconductor light emitting element, a relative position of the semiconductor light emitting element with respect to the optical system with good precision and easily form a high precision light distribution pattern, such as the light emitting diode device 102, as a light source for the vehicle headlamp.

According to an aspect of one or more embodiments of the invention, a vehicle headlamp includes:

a projection lens disposed on a central axis of a lens extending in a front-rear direction of a vehicle;

an LED unit including a semiconductor light emitting element disposed in rear of the projection lens, a heat radiating board having a top surface to which the semiconductor light emitting element is directly fixed, and a contact formed on the heat radiating board to receive electric power causing the semiconductor light emitting element to emit light;

a reflector formed integrally with the projection lens, wherein the reflector is adapted to forwardly reflect direct light emitted from the semiconductor light emitting element to a central axis of the lens; and a light source mount having a unit support surface that is in direct contact with a bottom surface of the heat radiating board and that supports the LED unit, a unit positioning portion adapted to directly abut against a side surface of the heat radiating board and to position the LED unit, a reference surface adapted to position the projection lens and the reflector in a direction of the central axis of the lens, and a positioning section adapted to position the projection lens and the reflector in a direction perpendicular to the central axis of the lens.

According to such a vehicle headlamp, the LED unit efficiently radiates heat generated by the semiconductor light emitting element. Thus, the semiconductor light emitting element can maintain high luminosity.

Also, the positioning of the reflector, which is formed integrally with the projection lens, with respect to the light source mount, which supports the LED unit positioned with the unit support surface and the unit positioning portion, can be achieved with good precision by utilizing the reference surface and the positioning portion. Thus, the relative positions of the optical system, which includes the projection lens and the reflector, and the semiconductor light emitting element, can be managed with good precision. Consequently, a high precision light distribution pattern can easily be formed.

According to another aspect of one or more embodiments of the invention, the vehicle headlamp may further include a shade provided between the projection lens and the semiconductor light emitting element, wherein the shade is operable to block off a part of the light reflected from the reflector to form a cutoff line in a light distribution pattern based on light passed through the projection lens.

According to such a configuration, the relative positions of the optical system which includes the shade and the semiconductor light emitting element can be managed with good precision. Consequently, a high precision light distribution pattern having a cutoff line can easily be formed.

According to another aspect of one or more embodiments of the invention, the vehicle headlamp may further include an attachment having an electric power feeding portion adapted to receive electric power, which causes the semiconductor light emitting element to emit light, from an external power plug and to supply the electric power to the contact, wherein the attachment is operable to hold the LED unit in a state in which the bottom surface and a part of the side surface of the heat radiating board is exposed, and in which a space above the light emitting element is open.

According to such a configuration, the attachment surrounds and holds the LED unit. Thus, there is no fear that an operator's hand or a tool touches the contact. Consequently, foreign substances can be prevented from adhering to the contact.

According to another aspect of one or more embodiments of the invention, a vehicle headlamp includes:

a projection lens disposed on a central axis of a lens extending in a front-rear direction of a vehicle;

a first LED unit including a first semiconductor light emitting element disposed in rear of the projection lens, a first heat radiating board having a top surface to which the first semiconductor light emitting element is directly fixed, and a first contact formed on the first heat radiating board to receive electric power causing the first semiconductor light emitting element to emit light;

a first reflector formed integrally with the projection lens, wherein the first reflector is adapted to forwardly reflect direct light emitted from the first semiconductor light emitting element to a central axis of the lens;

a second LED unit including a second semiconductor light emitting element disposed substantially back to back with the first semiconductor light emitting element, a second heat radiating board having a top surface to which the second semiconductor light emitting element is directly fixed, and a second contact formed on the second heat radiating board to receive electric power causing the second semiconductor light emitting element to emit light;

a second reflector formed integrally with the projection lens, wherein the second reflector is adapted to forwardly reflect direct light emitted from the second semiconductor light emitting element; and a light source mount having first and second unit support surfaces that are in direct contact with bottom surfaces of the first and second heat radiating boards, respectively, and that respectively support the first and second LED units, first and second unit positioning portions which directly abut against side surfaces of the first and second heat radiating boards, respectively, and which position the first and second LED units, a reference surface adapted to position the projection lens and the first and second reflectors in a direction of the central axis of the lens, and a positioning section adapted to position the projection lens and the first and second reflectors in a direction perpendicular to the central axis of the lens.

According to such a vehicle headlamp, for example, in the first LED unit, a cutoff line of a passing light distribution pattern (low beam light distribution pattern) is formed. Also, what is called a "hot zone" can be formed as a high luminosity region. At the second LED unit, a good passing light distribution pattern can be formed as a whole by forming a diffusion region at the second LED unit.

Further, the first and second LED units efficiently radiate heat generated by the first and second semiconductor light emitting elements, respectively. Thus, the first and second semiconductor light emitting elements can maintain high luminosity.

Also, the positioning of the first and second reflectors, each of which is formed integrally with the projection lens, with respect to the light source mount that supports the first and second LED units positioned with the first and second unit support surfaces and the first and second unit positioning portions, can be achieved with good precision by utilizing the reference surface and the first and second positioning portions. Thus, the relative positions of the optical system, which includes the projection lens and the first and second reflectors, and the first and second semiconductor light emitting elements, can be managed with good precision. Consequently, a high precision light distribution pattern can easily be formed.

According to another aspect of one or more embodiments of the invention, the vehicle headlamp may further include a shade provided between the projection lens and the first semiconductor light emitting element, wherein the shade is operable to block off a part of the light reflected from the first reflector to form a cutoff line in a light distribution pattern based on light passed through the projection lens.

According to such a configuration, the relative positions of the optical system, which includes the shade and the first semiconductor light emitting element can be managed with good precision. Consequently, a high precision light distribution pattern having a cutoff line can easily be formed.

According to another aspect of one or more embodiments of the invention, the vehicle headlamp may further include:

a first attachment having an first electric power feeding portion adapted to receive electric power, which causes the first semiconductor light emitting element to emit light, from an external power plug and to supply the electric power to the first contact; and a second attachment having a second electric power feeding portion adapted to receive electric power, which causes the second semiconductor light emitting element to emit light, from an external power plug and to supply the electric power to the second contact, wherein the first attachment is operable to hold the LED unit in a state in which the bottom surface and a part of the side surface of the first heat radiating board is exposed, and in which a space above the first light emitting element is open, and the second attachment is operable to hold the second LED unit in a state in which the bottom surface and a part of the side surface of the second heat radiating board is exposed, and in which a space above the second light emitting element is open.

According to such a configuration, the first and second attachments surround and hold the first and second LED units, respectively. Thus, there is no fear that an operator's hand or a tool touches the contact. Consequently, foreign substances can be prevented from adhering to the contact.

According to one or more aspects of one or more embodiments of the invention, the LED units efficiently radiate heat generated by the semiconductor light emitting elements. Thus, the semiconductor light emitting elements can maintain high luminosity.

Also, the positioning of the reflector formed integrally with the projection lens with respect to a light source mount, which supports the LED units, is achieved with good precision using the reference surface and the positioning portion. Thus, the relative positions of the optical system which includes the projection lens and the reflector, and the semiconductor light emitting element can be controlled. Consequently, a high-precision light distribution pattern can easily be formed.

Accordingly, an excellent vehicle headlamp capable of assuring, even in the case of using a semiconductor light emitting element, the relative position of the semiconductor light emitting element with respect to the optical system with good precision and of easily forming a high precision light distribution pattern can be provided.

Other aspects and advantages of the invention will be apparent from the following description and the appended claims.

DETAILED DESCRIPTION

Hereinafter, a vehicle headlamp according to an embodiment of the invention will be described in detail with reference to the accompanying drawings.

Figure 1:
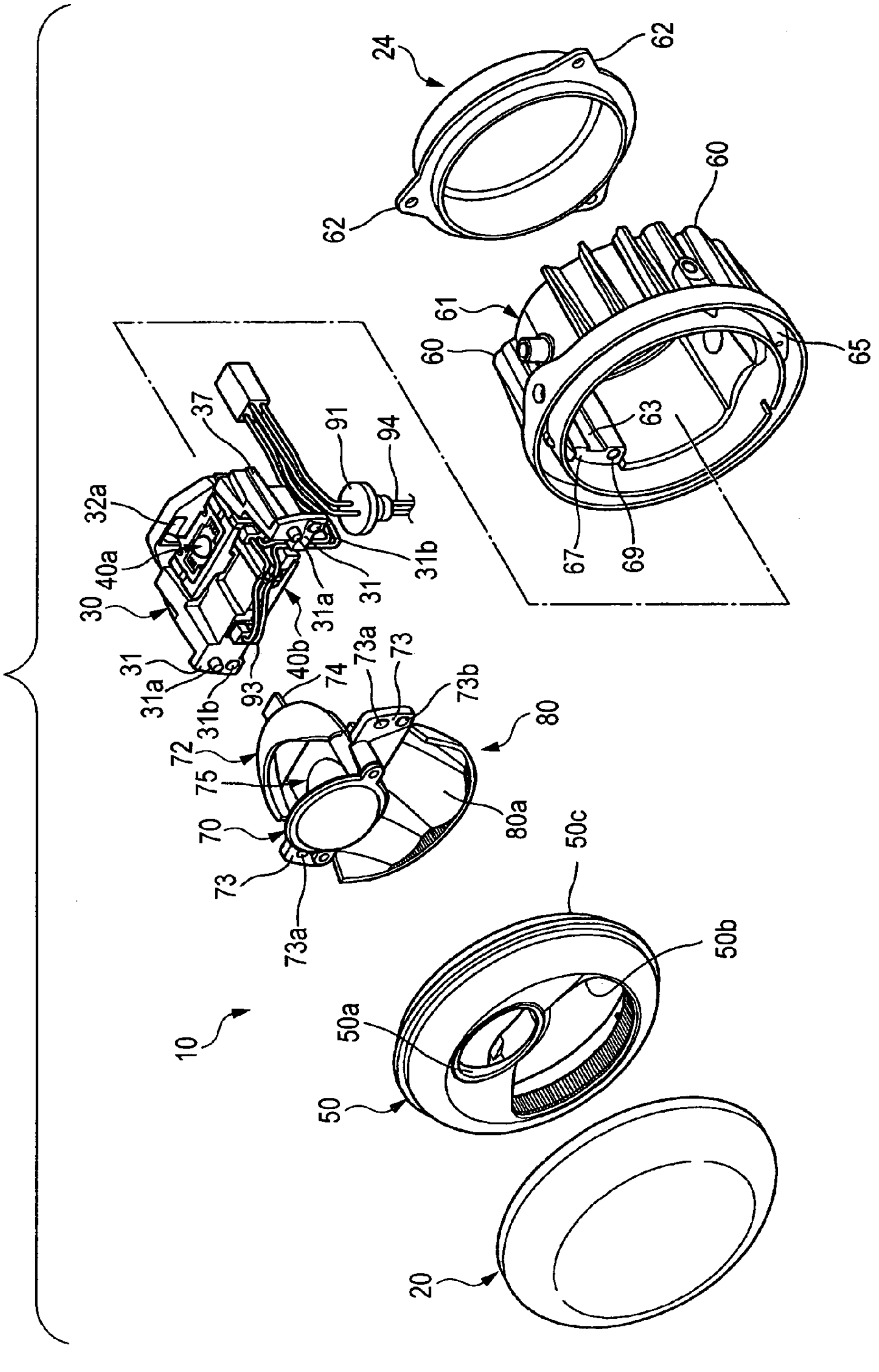
FIG. 1 is a schematic exploded perspective view illustrating a vehicle headlamp according to an embodiment of the invention.
Figure 2:
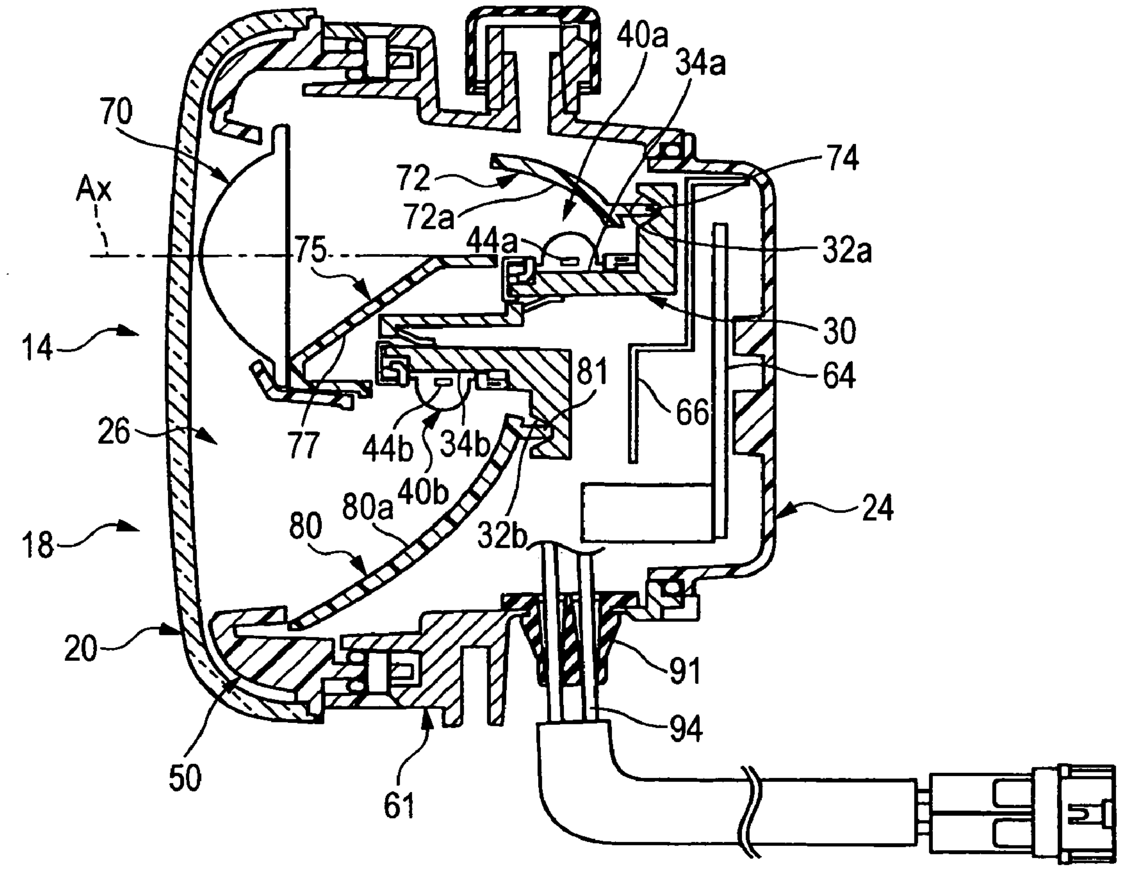
FIG. 2 is a schematic longitudinal cross-sectional view illustrating the vehicle headlamp shown in FIG. 1.
Figure 3:
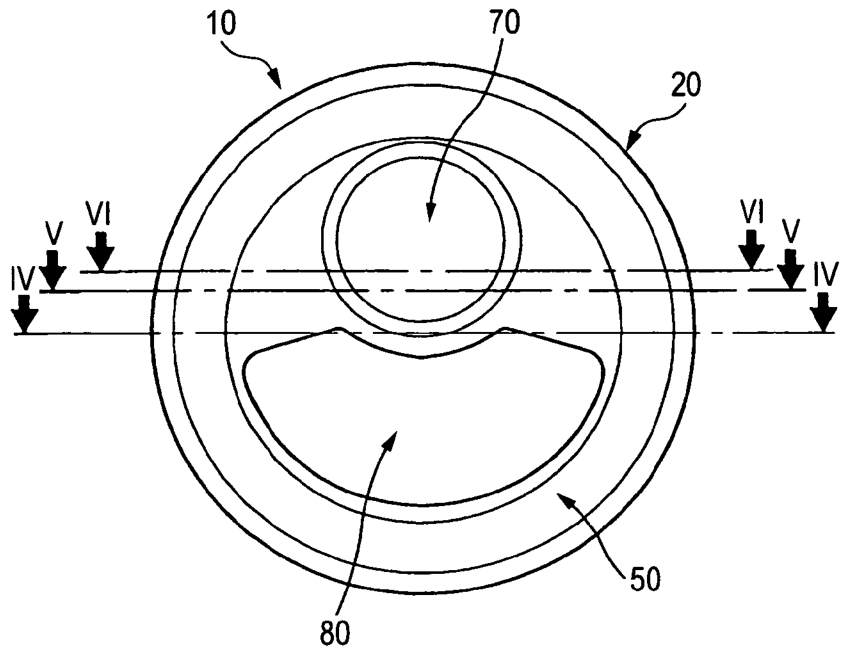
FIG. 3 is a front view of a light fitting unit shown in FIG. 2.

As shown in FIGS. 1 and 2, a vehicle headlamp 10 according to one embodiment is a fog lamp configured so that a first light distributing unit 14 and an second light distributing unit 18 are housed in a lamp chamber 26 defined by a lamp body 61, a transparent front cover (or cover) 20 attached to a front opening end portion thereof through an extension 50, and a rear cover 24 attached to a rear opening end portion thereof.

Incidentally, a vehicle headlamp according to one or more embodiments of the invention is not limited to the fog lamp as shown. A vehicle headlamp according to one or more embodiments of the invention can be applied to various vehicle headlamps, such as a general headlamp and a bending lamp.

As shown in FIG. 2, the lamp chamber 26 contains a projection lens 70 disposed on the central axis Ax extending in a front-rear direction of a vehicle, a first LED unit 40*a* having a first LED (first semiconductor light emitting element) 44*a* disposed in a rear of the projection lens 70, a first reflector 72 that is formed integrally with the projection lens 70 and forwardly reflects direct light from the first LED 44*a* to the central axis Ax of the lens, a second LED unit 40*b* that is placed substantially back to back with the first LED unit 40*a* and has a second LED (second semiconductor light emitting element) 44*b*, a second reflector 80 that is formed integrally with the projection lens 70 and forwardly reflects direct light form the second LED 44*b* to the central axis Ax of the lens, and a light source mount 30 that positions and supports the first LED unit 40*a* and the second LED unit 40*b*.

The lamp body 61 is constituted as an aluminium-pressure die-cast cylinder opened in front and rear surfaces, as shown in FIGS. 1 and 2. An annular seal groove 65 is formed in the front opening end portion of the lamp body 61. Three attaching portions 60 are formed on the rear opening end portion.

Also, the light source mount 30 which the first LED unit 40*a* and the second LED unit 40*b* are positioned at and fixed to, is mounted in the lamp body 61. Paired attaching portions 31, 31 are provided on both front end portions of the light source mount 30. Paired guide ribs 37 are provided on both side portions of the light source mount 30 to protrude therefrom.

The light source mount 30 is positioned in the direction of the central axis Ax of the lens by causing the attaching portions 31 to abut against attaching portions 67 provided inside the lamp body 61. The guide ribs 37 are insert-fitted into paired guide grooves 63 that are formed in inner walls of the lamp body 61. Consequently, the light source mount 30 is positioned in a direction perpendicular to the central axis Ax of the lens.

Incidentally, the lamp body 61 and the light source mount 30 according to the embodiment are metallic aluminium-pressure die-cast parts. Accordingly, as compared with a case where the lamp body and the light source mount are formed of a synthetic resin, heat resistance and dissipation can be enhanced. Thus, heat generated by the first LED 44*a* and the second LED 44*b* can efficiently be radiated. Consequently, the miniaturization of the light fitting can be achieved.

Figure 4:
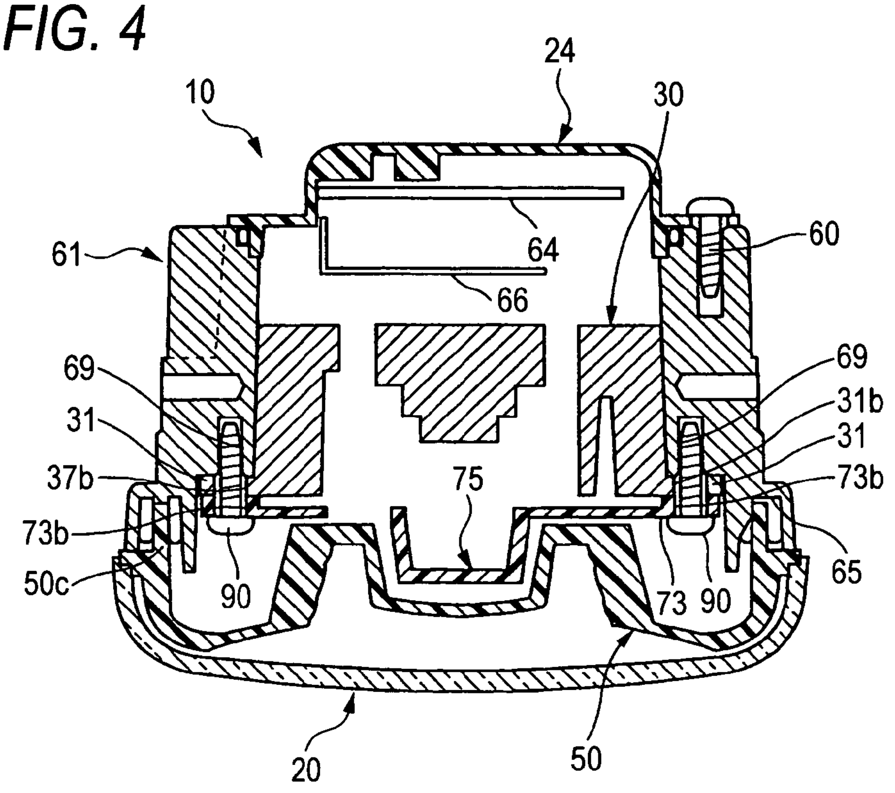
FIG. 4 is a cross-sectional view illustrating the light fitting unit, which is taken on line IV-IV in the direction of an arrow shown in FIG. 3.

As shown in FIG. 4, the annular projection 50*c* of the extension 50 (to be described later) is attached in the seal groove 65. The extension 50 and the lamp body 61 are bonded to each other with a sealing agent filled into the seal groove 65. Also, the gap between both the members is sealed with the sealing agent.

On the other hand, the rear cover 24 is attached with screws to the attaching portions 60 formed on the rear opening end portion of the lamp body 61.

As shown in FIGS. 1 and 2, the rear cover 24 is constituted as an aluminium-pressure die-cast and bottomed cylinder to cover the rear opening of the lamp body 61. Inside the rear cover 24, a drive circuit (not shown) used to drive the first LED 44*a* and the second LED 44*b*, a socket, and the like are mounted on a circuit board 64. The periphery of the circuit board 64 is covered with an electromagnetic shield cover 66. Also, the space provided inside the rear cover 24 is filled with resins, such as urethane, until the circuit board 64 is hidden. Thus, countermeasures against moisture content and vibrations applied to drive circuit parts are taken.

Electric power is supplied to the drive circuit through lead wires 94 that are passed through a grommet 91 disposed under the lamp body 61 and that are connected to a battery (not shown). Also, electric power is supplied to the first LED unit 40*a* and the second LED unit 40*b* mounted on the light source mount 30 through lead wires 93.

As shown in FIGS. 1 and 2, the first light distributing unit 14 according to the embodiment shown is a light fitting unit of what is called the projector-type. The first light distributing unit 14 has the projection lens 70 disposed on the central axis Ax of the lens, which extends in the front-rear direction of the vehicle, the first LED unit 40*a* having the first LED 44*a* disposed at the rear side of the projection lens 70, the first reflector 72 which is preliminarily integral with the projection lens 70 and forwardly reflects direct light emitted from the first LED 44*a* to the central axis Ax of the lens, and a connecting member 75.

The first reflector 72 according to the embodiment shown is formed into a substantially dome-like shape using, for example, polycarbonate, and is disposed above the first LED 44*a*. Also, aluminum evaporation is performed on the surface of the first reflector 72. The first reflector 72 has a first reflecting surface 72*a* that forwardly reflects direct light emitted from the first LED 44*a* to the central axis Ax of the lens.

The first reflecting surface 72*a* serves as a reflecting surface that converges and reflects light from the first LED 44*a* to the projection lens 70 placed forwardly from the first LED 44*a*. A vertical cross-section of the first reflecting surface 72*a*, which includes the central axis Ax of the lens, is shaped into a substantially elliptic curve so that the center of the first LED 44*a* is set to be a first focal point F1, and that the vicinity of the rear focal point of the projection lens 70 is set to be a second focal point F2. The eccentricity of the elliptic curve is set to gradually increase from the vertical cross-section to a horizontal cross-section. The first reflecting surface 72*a* reflects light, which is radiated from the first LED 44*a*, to the second focal point F2.

Figure 6:
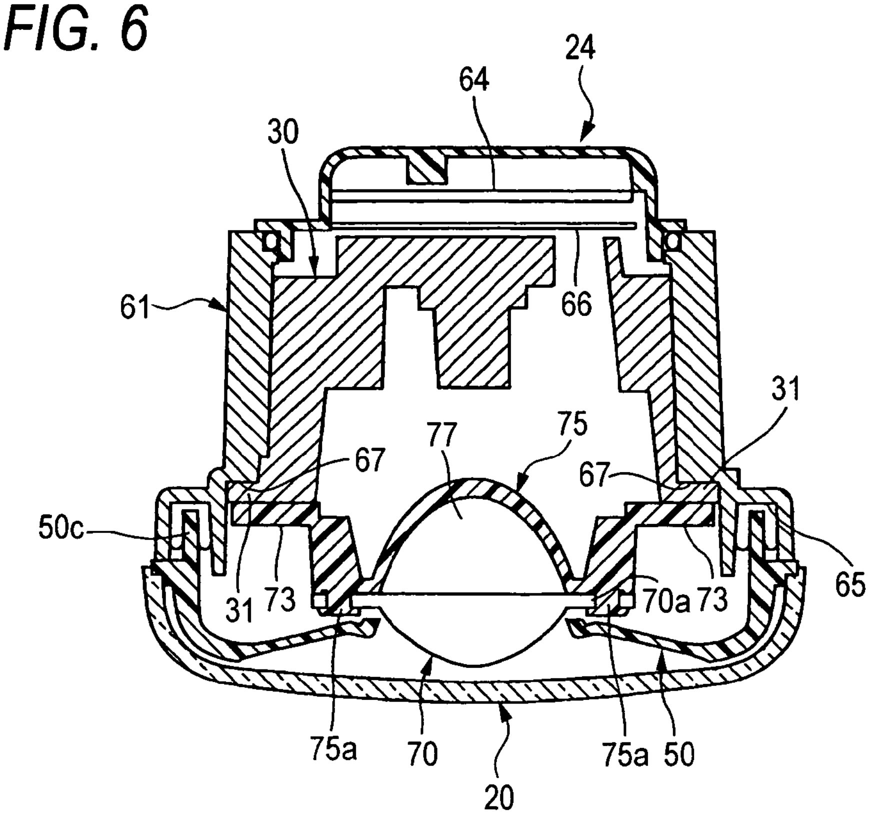
FIG. 6 is a cross-sectional view illustrating the light fitting unit, which is taken on line VI-VI in the direction of an arrow shown in FIG. 3.
Figure 7:
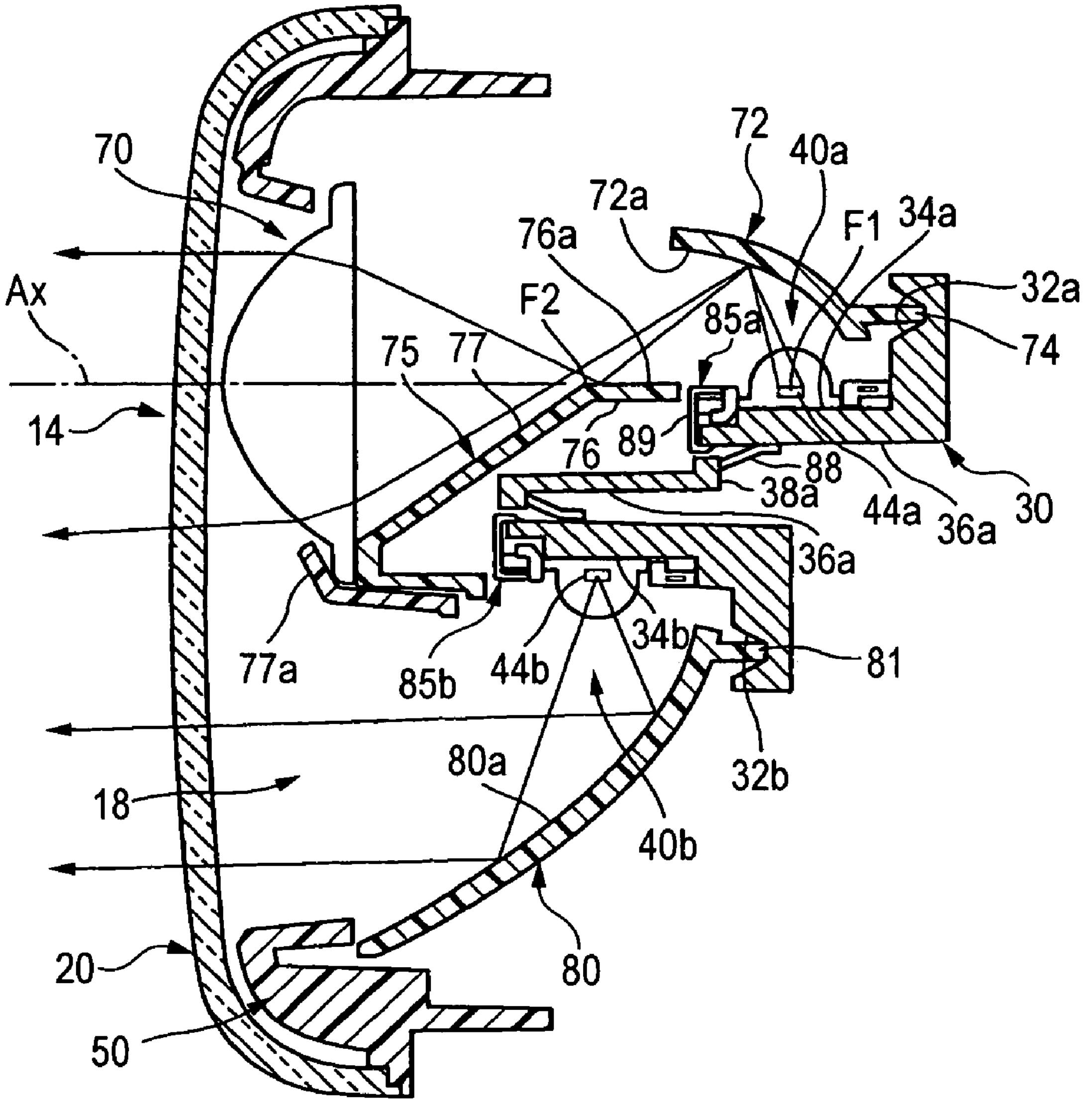
FIG. 7 is a cross-sectional view illustrating a primary part of the light fitting unit shown in FIG. 2.
Figure 10A:
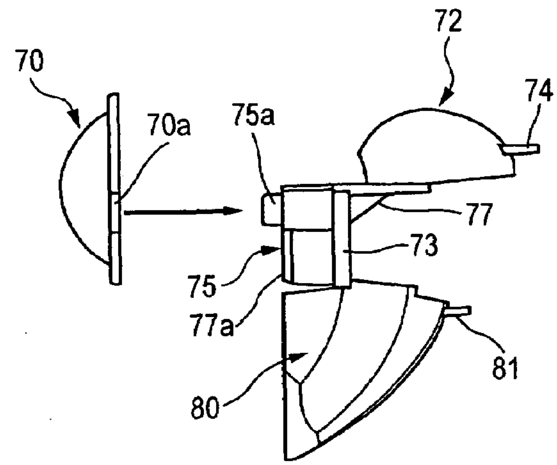
FIG. 10A is an exploded view illustrating a projection lens and a reflector shown in FIG. 1.
Figure 10B:
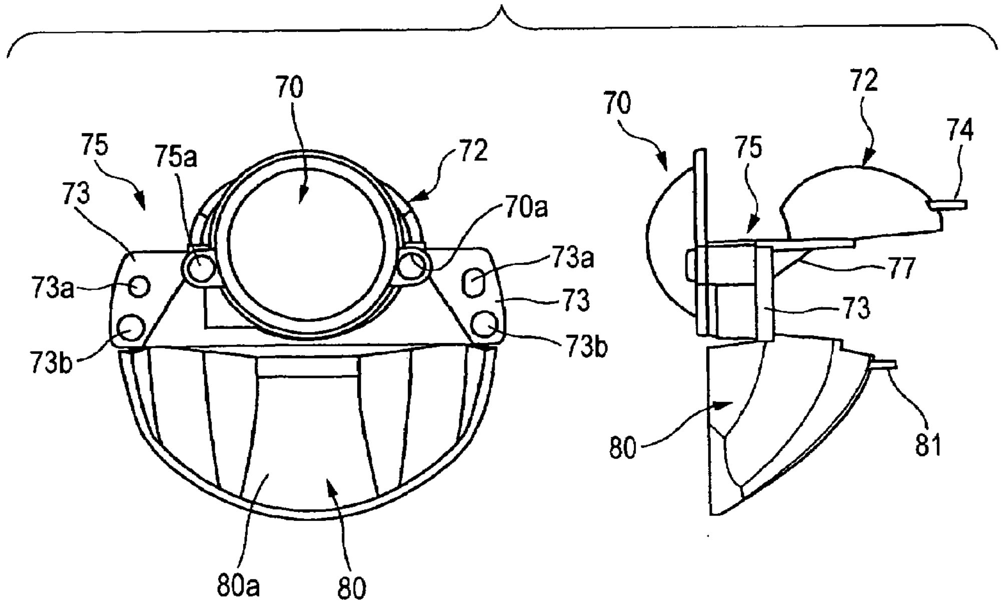
FIG. 10B is an assembling view illustrating the projection lens and the reflector shown in FIG. 1.

As shown in FIGS. 2 and 7, the connecting member 75 has a flat portion 76 disposed under and in parallel to the central axis Ax of the lens, and a substantially tub type ornamental portion 77 shaped like a semi-tube. The connecting member 75 is formed of polycarbonate as a molded part to be integral with the first reflector 72, and is disposed between the first LED 44*a* and the projection lens 70. The projection lens 70 is preliminarily positioned at and fixed to a front end portion 77*a* of the ornamental portion 77 by performing thermal caulking of engagement projections 75*a* and 75*a* insert-fitted into paired mounting holes 70*a*, 70*a*, respectively, as shown in FIGS. 6 and 10.

Similarly to the first reflector 72, aluminum evaporation is performed on the surface of each of the flat portion 76 and the ornamental portion 77. A second reflecting surface 76*a* adapted to reflect a part of light reflected from the first reflecting surface 72*a* of the first reflector 72 forwardly, that is, to the projection lens 70 is formed on the flat portion 76.

The ornamental portion 77 is disposed to extend obliquely downwardly from the boundary between the ornamental portion 77 and the flat portion 76 so as to connect an edge of the flat portion 76 to a lower outer circumferential edge of the projection lens 70. The ornamental portion 77 is disposed to cover a reflection optical path adapted to guide light reflected from the first reflecting surface 72*a* of the first reflector 72 to the projection lens 70. That is, the ornamental portion 77 is disposed between the second reflecting surface 76*a* and the projection lens 70 to be connected continuously to the second reflecting surface 76*a*. The ornamental portion 77 is formed into a substantially semi-tube-like tub extending adjacently along a reflection optical path extending from the first reflecting surface 72*a* to an outer circumferential edge of the substantially circular projection lens 70 to cover the reflection optical path without blocking off the light reflected from the first reflecting surface 72*a*.

Thus, light reflected from the first reflecting surface 72*a* can effectively be incident on the projection lens 70. Also, a space provided at the rear side of the reflection optical path can effectively be utilized. The miniaturization of the light fitting unit can be achieved. Additionally, because the second light distributing unit 18 is hidden by the ornamental portion 77 when seen from the front side, the appearance of the headlamp at non-lighting is enhanced.

The vicinity of the boundary between the flat portion 76 and the ornamental portion 77 is set to be the second focal point F2 of the first reflecting surface 72*a*. Also, the boundary portion provided between the second reflecting surface 76*a* of the flat portion 76 and the ornamental portion 77 functions as a shade constituting a predetermined cutoff line in the light distribution pattern of the vehicle headlamp 10.

A light distribution pattern having a cutoff line of a light distribution pattern for the fog lamp can be formed by irradiating light from the first light distributing unit 14. Also, there is no need for additionally providing a shading member for forming a cutoff line. Consequently, the number of parts of the headlamp can be reduced.

The projection lens 70 is formed using glass or a transparent resin, such as polycarbonate or acrylic, to have a substantially hemispherical (or dome-like) outer shape. The projection lens 70 is disposed at the rear side of the front cover 20. When light reflected from the first reflecting surface 72*a* propagates along the ornamental portion 77, the light is forwardly transmitted (see FIG. 7).

At that time, the light reflected from the first reflecting surface 72*a* is transmitted by a substantially lower half of the projection lens 70 and is then irradiated on the front cover 20. On the other hand, a part of the light reflected from the first reflecting surface 72*a* is reflected by the second reflecting surface 76*a*. The light reflected by the second reflecting surface 76*a* is transmitted by a substantially upper half of the projection lens 70 and is then irradiated on the front cover 20.

Meanwhile, the second light distributing unit 18 is a light fitting unit of what is called the reflection type. The second light distributing unit 18 includes the second LED unit 40*b* having the second LED 44*b* disposed substantially back-to-back with the first LED 44*a*, and the second reflector 80 that is formed integrally with the projection lens 70 and that forwardly reflects direct light emitted from the second LED 44*b*. Incidentally, the second LED 44*b* is disposed displaced forwardly from the first LED 44*a*. Thus, heat dissipation is enhanced. Heat generated by each of the light emitting elements is suppressed from affecting the other light emitting elements. Thus, the temperature of each of the light emitting elements is suppressed from rising due to self-heating.

The second reflector 80 is formed of polycarbonate integrally with the first reflector 72 in addition to the connecting member 75. The second reflector 80 is disposed at the rear side of the extension 50.

Further, the second reflector 80 is positioned more forwardly from the light fitting than the rear end portion of the first reflector 72. Also, the second reflector 80 is provided below the second LED 44*b*. The reflecting surface 80*a* of the second reflector 80 is formed as a reflecting surface by employing a substantial paraboloid of revolution, whose focal point is set in the vicinity of the second LED 44*b*, as a reference surface.

That is, the connecting member 75 according to the embodiment shown can assure the relative position of the optical system, in which the projection lens 70, the first reflector 72, the second reflector 80, and the ornamental portion 75 are integrally formed, with good precision.

As shown in FIG. 1, the extension 50 is shaped substantially like a disc so that the annular projection 50*c* to be mounted in the seal groove 65 of the lamp body 61 is provided on a rear-side outer circumferential portion to protrude therefrom. A main light distribution opening 50*a* into which the projection lens 70 is inserted, and a fan-like auxiliary light distribution opening 50*b*, at the rear side of which the second reflector 80 is placed, are formed in the front surface of the extension 50. The extension 50 shields the first light distributing unit 14 and the second light distributing unit 18 so that the periphery of each of the light distribution units 14 and 18 is hidden from the direction of the front of the light fitting.

Next, the configuration of and a fixing method for each of the first LED unit 40*a* of the first light distributing unit 14 and the second LED unit 40*b* of the second light distributing unit 18 is described below. Incidentally, the configuration of and the fixing method for the second LED unit 40*b* are substantially similar to the configuration of and the fixing method for the first LED unit 40*a*. Therefore, only the configuration of and the fixing method for the first LED unit 40*a* are described below with reference to FIGS. 11 to 13 by way of example.

Figure 11:
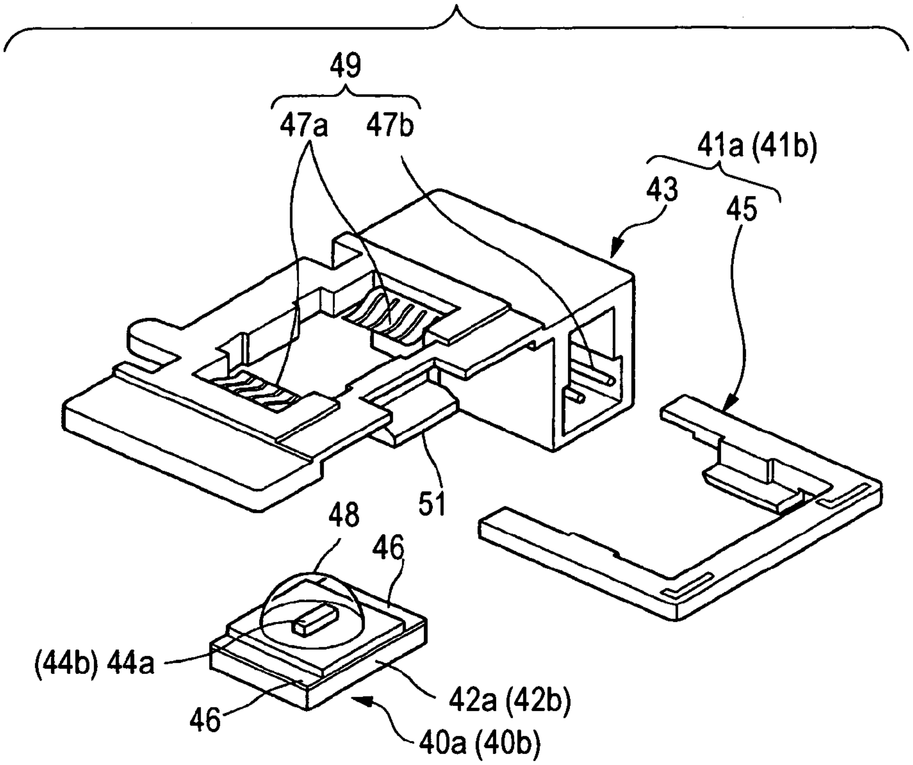
FIG. 11 is an exploded perspective view illustrating an attachment shown in FIG. 8.

As shown in FIG. 11, the first LED unit 40*a* has a first heat radiating board 42*a*, to the top surface of which the first LED 44*a* is directly fixed, and also has first contacts 46 which are formed on the first heat radiating board 42*a* and receive electric power required to cause the first LED 44*a* to emit light.

The first heat radiating board 42*a* is made of a material, such as ceramics, which are high in heat conductivity and are low in rate of thermal expansion, and is shaped substantially like a rectangle. The paired first contacts 46 are respectively formed on both ends in the longitudinal direction of the first heat radiating board 42*a* across the first LED 44*a*. The first LED unit 40*a* further has a dome lens 48 that is fixed to the top surface of the first heat radiating board 42*a* and that covers the first LED 44*a*.

Further, a first attachment 41*a* holds the first LED unit 40*a* to surround the first LED unit 40*a* in a state in which the bottom surface and at least a part of the side surfaces of the first heat radiating board 42*a* are exposed, and in which a space provided above the first LED unit 40*a* is open. The first attachment 41*a* according to the embodiment shown holds the first LED unit 40*a* in a state in which most of the bottom surface of the first heat radiating board 42*a* is exposed.

Thus, the first LED unit 40*a* is held in a state in which most of the bottom surface of the first heat radiating board 42*a* is exposed. Consequently, heat generated due to the light emission by the first LED unit 40*a* is efficiently radiated. Accordingly, the temperature of the first LED 44*a* is suppressed from rising. Thus, luminous efficiency is high. Consequently, high-intensity light can continuously be outputted.

Figure 12:
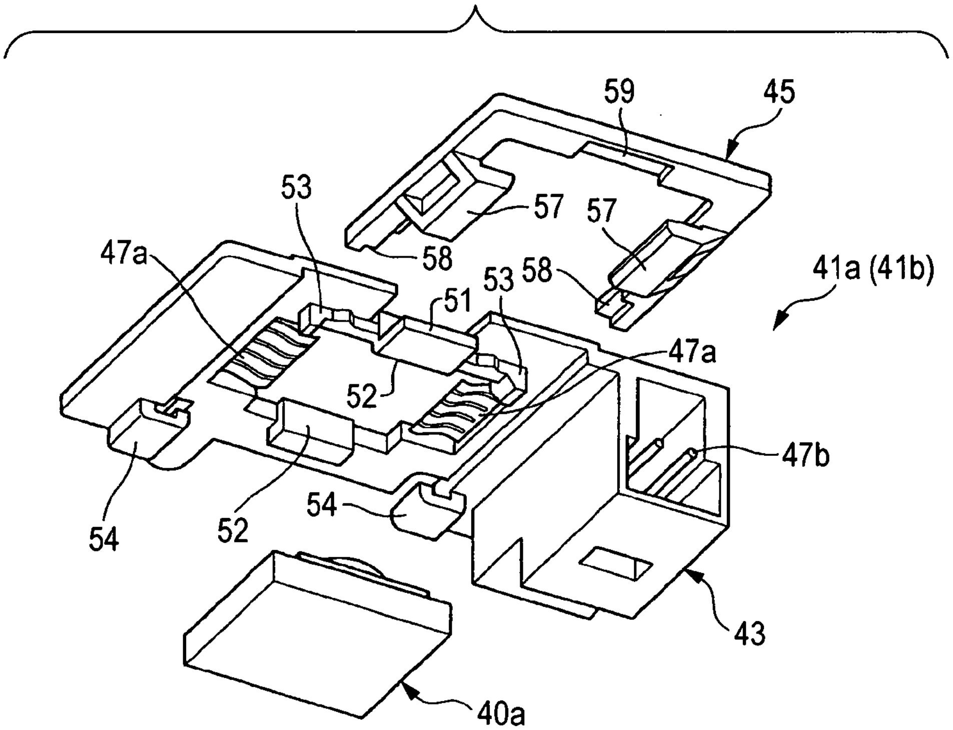
FIG. 12 is an exploded perspective view illustrating the attachment shown in FIG. 11, which is taken from below.
Figure 13:
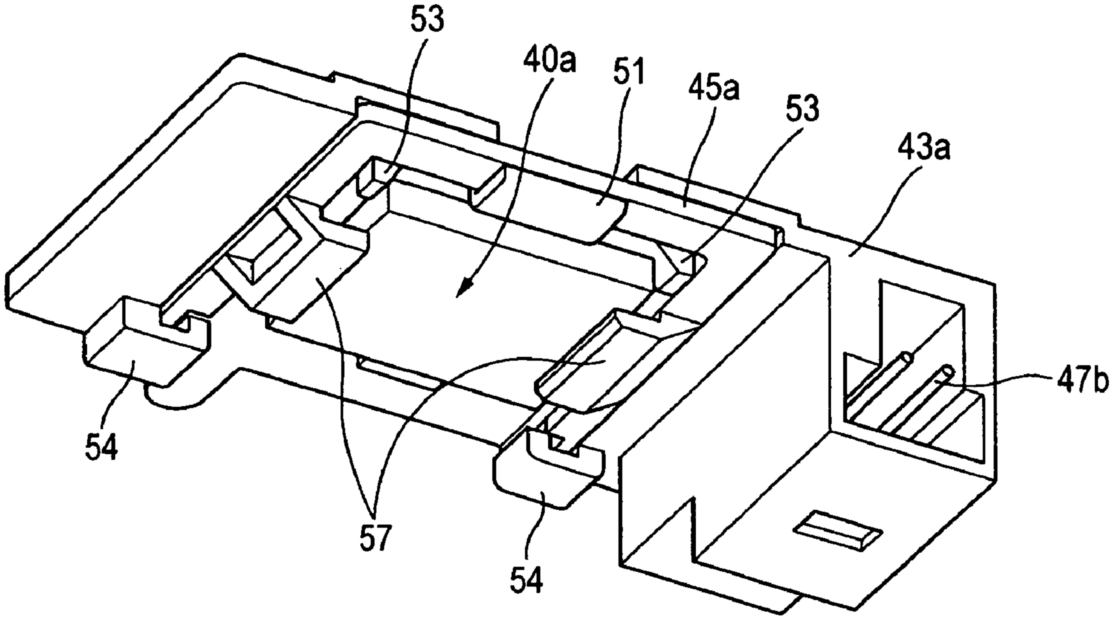
FIG. 13 is a perspective view illustrating an assembled state of the attachment shown in FIG. 1.
Figure 14:
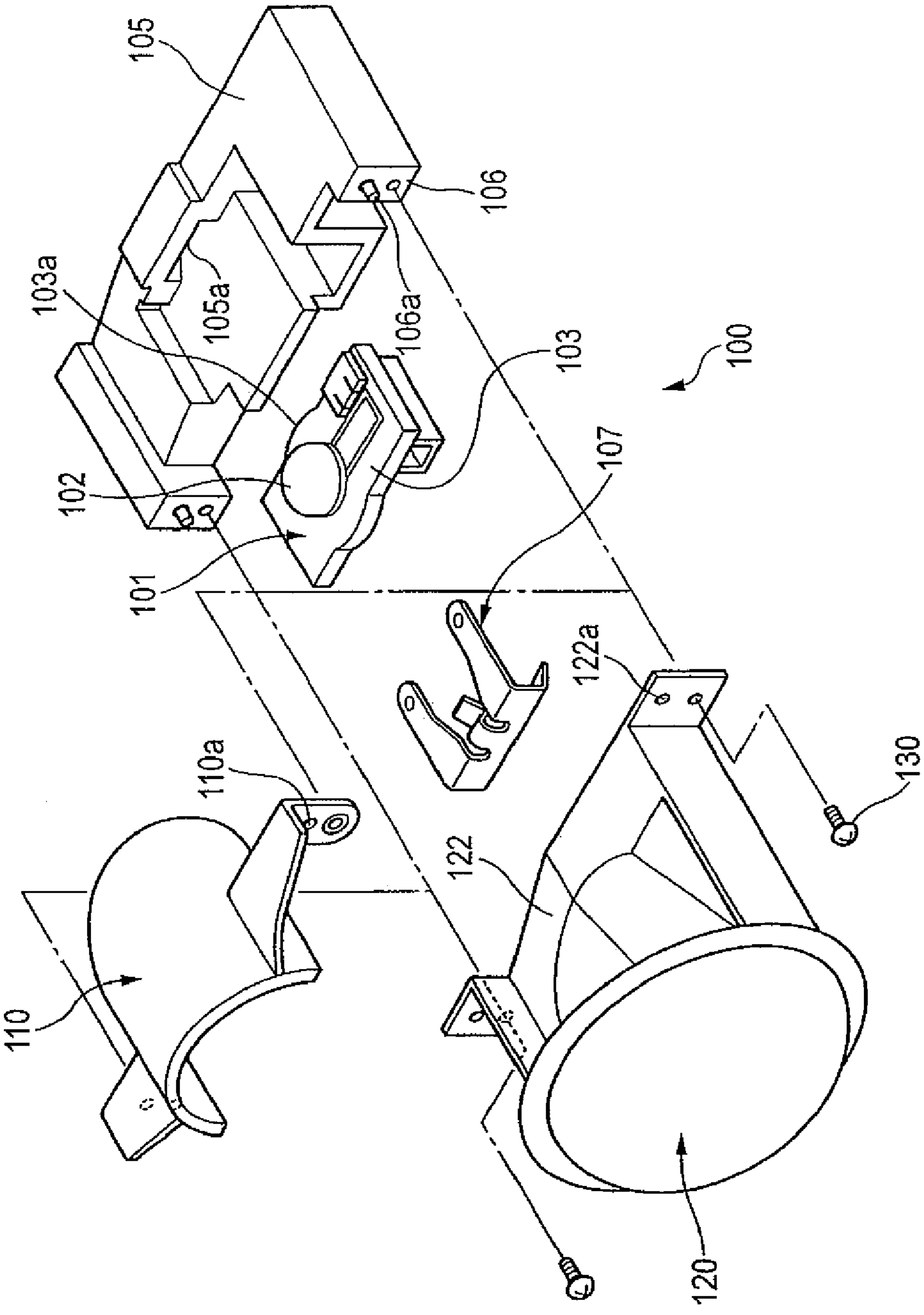
FIG. 14 Prior Art
FIG. 14 is an exploded perspective view illustrating a light source unit of a vehicle headlamp in the related art.

As shown in FIGS. 11 to 13, the first attachment 41*a* includes an attachment body 43 and a bottom surface support member 45. The bottom surface support member 45 is fitted into the attachment body 43 by being slid laterally. The first LED unit 40*a* is held sandwiched between the attachment body 43 and the bottom surface support member 45.

The attachment body 43 has a first power feeding portion 49. The first power feeding portion 49 includes an input portion 47*b* and spring terminals 47*a*, which are electrically connected to the input portion 47*b*. In a case where an external power plug is inserted into an electrical receptacle, the input portion 47*b* receives electric power necessary for causing the first LED 44*a* to emit light. The spring terminals 47*a* are electrically connected to the contact 46 by downwardly pushing the top surface of the contact 46. Then, electric power needed for causing the first LED 44*a* to emit light is supplied thereto.

That is, the first attachment 41*a* can hold the first LED unit 40*a* and also can stably supply electric power thereto by utilizing the pushing force of the spring terminals 47*a*.

As shown in FIG. 12, an attachment body 43 has board guides 53 and 53 adapted to perform the positioning of the first LED unit 40*a* with respect to the attachment body 43. The board guides 52 and 53 are provided at intervals each of which is substantially equal to that at which the first heat radiating boards 42*a*. The positioning of the first LED units 40*a* is performed by guiding a side surface of the first heat radiating board 42*a* with a slope provided on each of the board guides 52 and 53.

The bottom surface support member 45 is substantially U-shaped, and has end catching portions 58 respectively provided at leading ends of each of the open ends. A rear end catching portion 59 is provided at a central portion opposite to the end catching portion 58.

The attachment body 43 has catching claws 54 which respectively engage with paired end catching portions 58 and hold the end catching portions 58. Also, the attachment body 43 has a catching claw 51 adapted to hold a rear end catching portion 59 at the side of the attachment body 43 in a case where the catching claws 54 engage with the end catching portions 58, respectively.

The bottom surface support member 45 further has contact holding portions 57 adapted to hold the contact between the contact 46 and each of the spring terminals 47*a* by holding the bottom surface of the first LED unit 40*a*.

Thus, first, the first LED unit 40*a* is assembled to the first attachment 41*a* in a state in which the contact 46 of the first LED unit 40*a* is opposed to the spring terminal 47*a* of the first attachment 41*a*.

Subsequently, the bottom surface support member 45 with the contact holding portion 57 down is slid so that the front end catching portion 58 engages the catching claws 54 and that the rear end catching portion 59 engages with the catching claw 51.

Consequently, the contact holding portion 57 is guided along the bottom surface of the first LED unit 40*a*. Then, the first LED unit 40*a* is fixed in a state shown in FIG. 13.

Although a detailed description is omitted, similarly, the second LED unit 40*b* is assembled and fixed to a second attachment 41*b*.

Next, a method of fixing the first attachment 41*a*, to which the first LED unit 40*a* is assembled and fixed, and the second attachment 41*b*, to which the second LED unit 40*b* is assembled and fixed, to the light source mount 30 is described below. Incidentally, the method of fixing the second attachment 41*b* to the light source mount 30 is substantially similar to the method of fixing the first attachment 41*a* to the light source mount 30. Therefore, only the method of fixing the first attachment 41*a* to the light source mount 30 is described with reference to FIGS. 8 and 9 by way of example.

Figure 8:
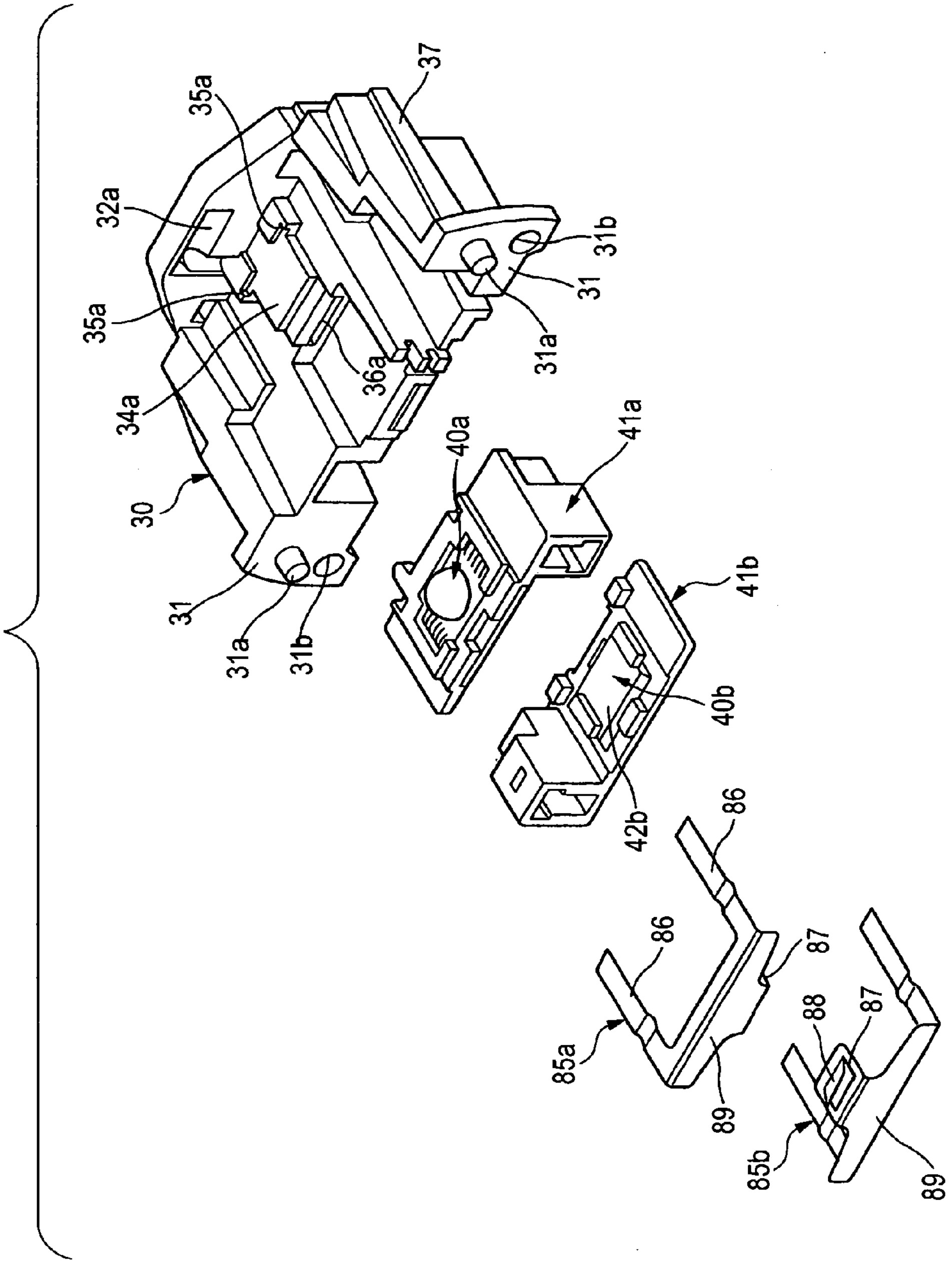
FIG. 8 is an exploded perspective view illustrating a primary part of the light fitting unit shown in FIG. 1.
Figure 9:
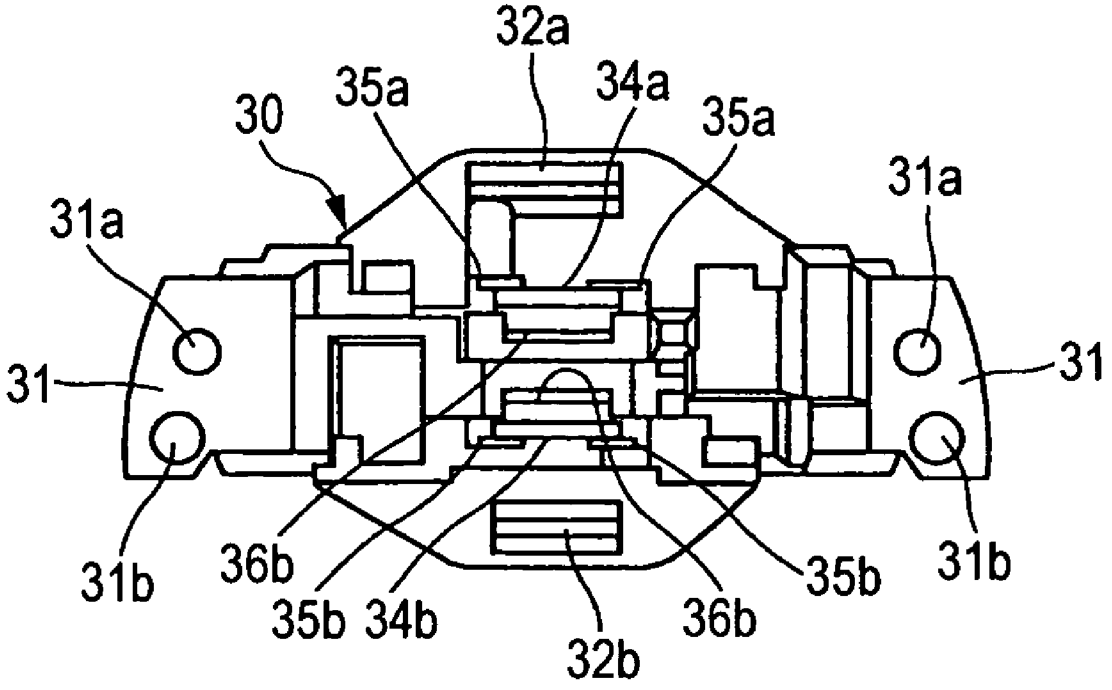
FIG. 9 is a front view illustrating a light source mount shown in FIG. 8.

As shown in FIGS. 8 and 9, the light source mount 30 has a first unit support surface 34*a*, which supports the first LED unit 40*a* in direct contact with the bottom surface of the first heat radiating board 42*a*, and also has first unit positioning portions 35*a* that directly abut against both side surfaces of the first heat radiating board 42*a* to thereby perform the positioning of the first LED unit 40*a*. Also, the light source mount 30 has a first catching surface 36*a* formed substantially in parallel to the first unit support surface 34*a* under the first unit support surface 34*a*. The light source mount 30 is formed of a highly thermal conductive member made of an aluminum alloy. Thus, the light source mount 30 has heat resistance and dissipation.

As shown in FIG. 8, a first clip 85*a* has a pair of top surface pushing portions 86 adapted to push both lateral ends of the top surface of the first attachment 41*a* against the light source mount 30, and also has a bottom surface catching portion 87 that engages with the first catching surface 36*a*. The first clip 85*a* sandwiches both the lateral ends of the top surface of the first attachment 41*a* and the first catching surface 36*a* with the paired top surface pushing portion 86 and the bottom surface catching portion 87. Thus, the bottom surface of the heat radiating board 42*a* is pushed against the first unit support surface 34*a* through the first attachment 41*a*.

Therefore, the first clip 85*a* can stably fix the first LED unit 40*a* to the light source mount 30. Also, heat generated by the first LED 44*a* can efficiently be radiated through the first radiating board 42*a*. Consequently, an amount of light from the first LED 44*a* can be prevented from being reduced due to heat.

Further, the first clip 85*a* sandwiches the top surface of the attachment 41 and the first catching surface 36*a*. Thus, the spring terminals 47*a* can further strongly push the contact 46. Consequently, the reliability of the electrical connection between the contact 46 and each of the spring terminals 47*a* can be enhanced.

Moreover, the first clip 85*a* has a side surface pushing portion adapted to abut against a side surface of the first attachment 41*a*. The first clip 85*a* also has a cut-up portion 88 provided at an end of the bottom surface catching portion 87. The cut-up portion 88 engages with the catching portion 38*a* provided under the catching surface 36*a* to be erected perpendicularly thereto. Thus, the fist clip 85*a* is fixed to the light source mount 30 (see FIG. 7).

A side surface pushing portion 89 pushes a side surface of the first attachment 41*a* against the inner portion (the right-side portion, as viewed in FIG. 7) of the light source mount 30 in a state in which the cut-up 88 engages with the catching portion 38*a*. Consequently, the first attachment 41*a* pushes the first heat radiating board 42*a* against the first unit positioning portion 35*a*. The first attachment 41*a* has a certain gap with respect to the light source mount 30 in a certain horizontal direction in a state in which the heat radiating board 42*a* abuts against the first unit positioning portion 35*a*.

That is, the first attachment 41*a* holds the first LED unit 40*a* in a state in which at least a part of the side surfaces of the first heat radiating board 42*a* is exposed. Thus, in a case where the first LED unit 40*a* is fixed to the light source mount 30, the first heat radiating board 42*a* can be positioned directly at the first unit support surface 34*a* and the first unit positioning portion 35*a* on the light source mount 30

Further, the first attachment 41*a* surrounds and holds the first LED unit 40*a* Thus, there is no fear that an operator's hand or a tool touches the contact 46 of the first LED unit 40*a*. Consequently, foreign substances can be prevented from adhering to the contact 46.

Additionally, although a detailed description is omitted, similarly, the second attachment 41*b* can position the second heat radiating board 42*b* directly at the second unit support surface 34*b* and the second unit positioning portion 35*b* on the light source mount 30.

Next, a method of fixing the connecting member 75, with which the projection lens 70, the first reflector 72, the second reflector 80, and the ornamental portion 77 functioning as a shade are formed integrally, to the light source mount 30 is described below.

The light source mount according to the embodiment shown has the projection lens 70, the reference surface used to position the first reflector 72 and the second reflector 80 in the direction of the central axis Ax of the lens, and the positioning portion used to position the first reflector 72 and the second reflector 80 in a direction perpendicular to the direction of the central axis Ax of the lens.

As shown in FIGS. 8 and 9, the reference surface according to the embodiment shown is constituted on the front surface of each of the attaching portions 31, 31 respectively provided on both end portions of the light source mount 30. The positioning portion according to the embodiment includes paired positioning projections 31*a*, 31*a* provided perpendicularly onto the front surfaces of the attaching portions 31, 31, and also includes paired concave portions 32*a*, 32*b* provided at the rear end portion of the light source mount 30 to extend in an up-down direction.

Additionally, the paired attaching portions 31, 31, the paired positioning projections 31*a*, 31*a*, and the paired positioning recesses 32*a* and 32*b* are preliminarily formed on the light source mount 30 with good precision.

Figure 5:
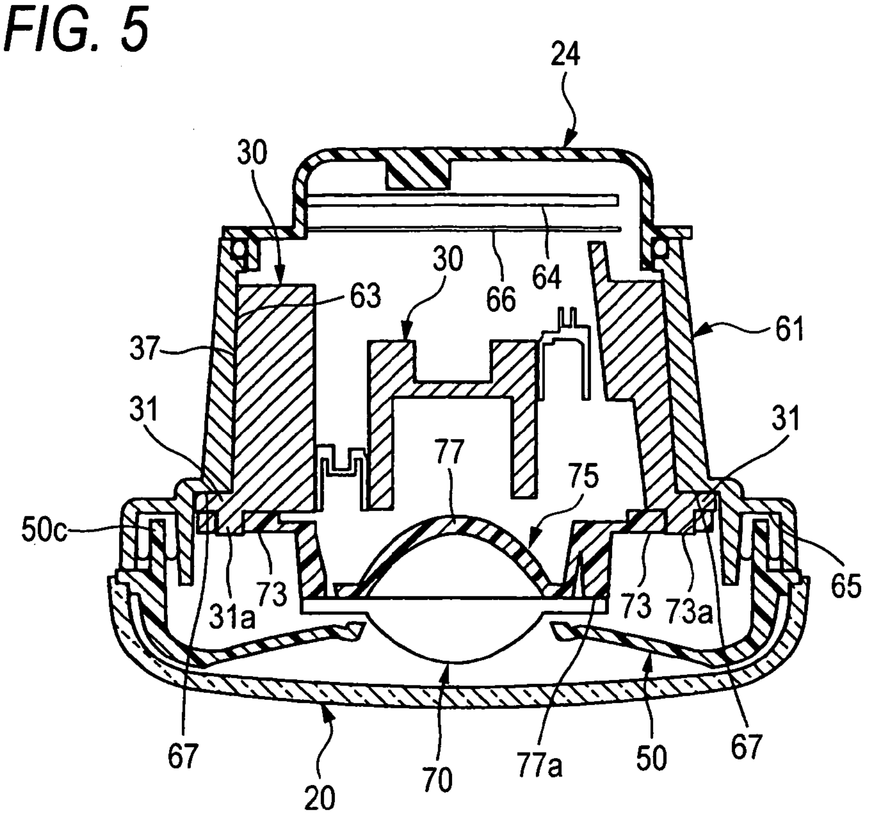
FIG. 5 is a cross-sectional view illustrating the light fitting unit, which is taken on line V-V in the direction of an arrow shown in FIG. 3.

The front surfaces of the attaching portions 31, 31 abut against the rear surface of the paired attaching portions 73, 73 provided in the connecting member 75 formed integrally with the projection lens 70, the first reflector 72, the second reflector 80, and the ornamental portion 77. Thus, the positioning of each of the projection lens 70, the first reflector 72, the second reflector 80 in the direction of the central axis Ax of the lens can be achieved (see FIG. 5).

The positioning projections 31*a* of the light source mount 30 are fitted into the positioning holes 73*a* formed in the attaching portions 73. Also, the positioning recesses 32*a*, 32*b* are respectively engaged with the positioning projections 74, 81 provided at the rear end portions of the first reflector 72 and the second reflector 80. Thus, the positioning of each of the projection lens 70, the first reflector 72, the second reflector 80 in a direction perpendicular to the direction of the central axis Ax of the lens can be achieved (see FIGS. 2 and 7). The positioning recesses 32*a*, 32*b* are formed as cross-sectionally V-shaped grooves extending in a horizontal direction. At assembling, the positioning projections 74, 81 can be introduced into the positioning recesses 32*a*, 32*b*, respectively.

The connecting member 75 is fixed, together with the light source mount 30, to the lamp body 61 by mounting-screws 90 that are passed through through-holes 73*b* formed in the paired attaching portions 73, 73 provided at the front side and through the through-holes 31*b* formed in the attaching portions 31, 31 of the light source mount 30 and that are screwed into screw holes 69 formed in the attaching portions 67, 67 of the lamp body 61 (see FIG. 4).

That is, the positioning of the connecting member 75, with which the projection lens 70, the first reflector 72, the second reflector 80, and the ornamental portion 77 are formed integrally, with respect to the light source mount 30 in the direction perpendicular to the direction of the central axis Ax of the lens is achieved by utilizing the positioning holes 73*a* which are formed in the paired attaching portions 73, 73 provided at the front side, and the positioning projections 74 and 81 provided on the rear end portions of the first reflector 72 and the second reflector 80.

Thus, the connecting member 75 is surely positioned at and fixed to the light source mount 30 in a direction perpendicular to the central axis Ax of the lens with good precision.

As described above, the first LED unit 40*a*, which has the first LED 44*a*, and the second LED unit 40*b*, which has the second LED 44*b*, are preliminarily positioned at and fixed to the light source mount 30 by the first unit support surface 34*a*, the second unit support surface 34*b*, the first unit positioning portion 35*a*, and the second unit positioning portion 35*b*.

Therefore, in the vehicle headlamp 10 according to the embodiment shown, the relative positions among the optical system that includes the projection 70, the first reflector 72, the second reflector 80, and the ornamental portion 77 functioning as a shade adapted to form a cutoff line, the first LED 44*a*, and the second LED 44*b* can be managed with good precision. A high precision light distribution pattern having the cutoff line can easily be formed using the first LED 44*a* and the second LED 44*b*, which are narrow in the light emitting region, as compared with conventional light sources.

Incidentally, the constituents of the vehicle headlamp according to one or more embodiments of the invention, for example, the lamp body, the cover, the projection lens, the semiconductor light emitting element, the head radiating board, the LED unit, the reflector, and the light source mount, are not limited to those described with reference to the above embodiments of the invention. It will be apparent to those skilled in the art that various modifications can be made without departing from the spirit of the invention.

For example, in the foregoing description of an above embodiment, the vehicle headlamp, in which the first light distributing unit 14 and the second light distributing unit 18 are housed in the lamp chamber 26, has been described by way of example. It is apparent that embodiments of the invention can be applied to a vehicle headlamp configured so that only the first light distributing unit of what is called the projector-type is housed in the lamp chamber.

Additionally, embodiments of the invention can be applied to a vehicle headlamp configured so that a plurality of combinations of a first light distributing unit and an second light distributing unit are housed in a lamp chamber, and another vehicle headlamp configured so that only a plurality of first light distributing units are housed in a lamp chamber.

While description has been made in connection with embodiments of the present invention, it will be obvious to those skilled in the art that various changes and modification may be made therein without departing from the present invention. It is aimed, therefore, to cover in the appended claims all such changes and modifications falling within the true spirit and scope of the present invention.

Description of Reference Numerals and Signs

10 vehicle headlamp
14 first light distributing unit
18 second light distributing unit
20 transparent cover (cover)
26 lamp chamber
30 light source mount
31 fixing portion (reference surface)
31*a* positioning projection (positioning portion)
32*a*, 32*b* positioning recesses (positioning portions)
40*a* first LED unit
40*b* second LED unit
41*a* first attachment
42*a* second attachment
44*a* first LED (first semiconductor light emitting element)
44*b* second LED (second semiconductor light emitting element)
46 contact
50 extension
61 lamp body
70 projection lens
72 first reflector
73 attaching portion
73*a* positioning hole
75 connecting member

What is claimed is:

1. A vehicle headlamp comprising:

a projection lens disposed on a central axis of a lens extending in a front-rear direction of a vehicle;

an LED unit including:

a semiconductor light emitting element disposed in rear of the projection lens, a heat radiating board having a top surface to which the semiconductor light emitting element is directly fixed, and a contact formed on the heat radiating board to receive electric power causing the semiconductor light emitting element to emit light;

a reflector adapted to forwardly reflect direct light emitted from the semiconductor light emitting element to a central axis of the lens; and a light source mount having:

a unit support surface that is in direct contact with a bottom surface of the heat radiating board and that supports the LED unit, a unit positioning portion adapted to directly abut against a side surface of the heat radiating board and to position the LED unit, a reference surface adapted to position the projection lens and the reflector in a direction of the central axis of the lens, and a positioning section adapted to position the projection lens and the reflector in a direction perpendicular to the central axis of the lens, wherein the projection lens and the reflector are formed in a single structure, wherein the reflector comprises a first positioning portion disposed at a rearmost part of the reflector, the positioning section of the light source mount comprises a second positioning portion, and the first positioning portion and the second positioning portion are engaged with each other, wherein one of the first and second positioning portions is introduced into the other of the first and second positioning portions, wherein said one of the first and second positioning portions comprises a projection, and the other of the first and second positioning portions comprises a recess which is caved in the direction of the central axis of the lens, and wherein a distal end of the projection abuts the recess.

2. The vehicle headlamp according to claim 1, further comprising:

a shade provided between the projection lens and the semiconductor light emitting element, wherein the shade is operable to block off a part of light reflected from the reflector to form a cutoff line in a light distribution pattern based on light passed through the projection lens, and wherein the shade is formed in a single structure with the projection lens and the reflector.

3. The vehicle headlamp according to claim 2, further comprising:

an attachment having an electric power feeding portion, wherein the electric power feeding portion is adapted to receive electric power, which causes the semiconductor light emitting element to emit light, from an external power plug and to supply the electric power to the contact, and wherein the attachment is operable to surround and hold the LED unit in a state in which the bottom surface and a part of the side surface of the heat radiating board is exposed, and in which a space above the light emitting element is open.

4. The vehicle headlamp according to claim 1, further comprising:

an attachment having an electric power feeding portion, wherein the electric power feeding portion is adapted to receive electric power, which causes the semiconductor light emitting element to emit light, from an external power plug and to supply the electric power to the contact, and wherein the attachment is operable to laterally surround and hold the LED unit in a state in which the bottom surface and a part of the side surface of the heat radiating board is exposed, and in which a space above the light emitting element is open.

5. The vehicle headlamp according to claim 1, further comprising: a lamp body; and a cover which forms a chamber with the lamp body, wherein the projection lens, the LED unit, the reflector, and the light source mount are housed in the chamber.

6. The vehicle headlamp according to claim 1, wherein the projection lens and the reflector are made of resin.

7. The vehicle headlamp according to claim 1, wherein the recess is formed as a cross-sectionally V-shaped groove that extends in a horizontal direction.

8. The vehicle headlamp according to claim 1, further comprising a connecting member formed as a molded part to be integral with the reflector, wherein the projection lens is directly fixed to a front end portion of the connecting member.

9. A vehicle lamp comprising:

a projection lens disposed on a central axis of a lens extending in a front-rear direction of a vehicle;

a first LED unit including:

a first semiconductor light emitting element disposed in rear of the projection lens, a first heat radiating board having a top surface to which the first semiconductor light emitting element is directly fixed, and a first contact formed on the first heat radiating board to receive electric power causing the first semiconductor light emitting element to emit light;

a first reflector adapted to forwardly reflect direct light emitted from the first semiconductor light emitting element to a central axis of the lens;

a second LED unit including:

a second semiconductor light emitting element disposed substantially back to back with the first semiconductor light emitting element, a second heat radiating board having a top surface to which the second semiconductor light emitting element is directly fixed, and a second contact formed on the second heat radiating board to receive electric power causing the second semiconductor light emitting element to emit light;

a second reflector adapted to forwardly reflect direct light emitted from the second semiconductor light emitting element; and a light source mount having:

first and second unit support surfaces that are in direct contact with bottom surfaces of the first and second heat radiating boards, respectively, and that respectively support the first and second LED units, first and second unit positioning portions which directly abut against side surfaces of the first and second heat radiating boards, respectively, and which position the first and second LED units, a reference surface adapted to position the projection lens and the first and second reflectors in a direction of the central axis of the lens, and a positioning section adapted to position the projection lens and the first and second reflectors in a direction perpendicular to the central axis of the lens, wherein the projection lens, the first reflector, and the second reflector are formed in a single structure, wherein the first reflector comprises a first positioning portion disposed at a rearmost part of the first reflector, the positioning section of the light source mount comprises a second positioning portion, and the first positioning portion and the second positioning portion are engaged with each other, wherein one of the first and second positioning portions is introduced into the other of the first and second positioning portions, wherein said one of the first and second positioning portions comprises a projection shape, and the other of the first and second positioning portions comprises a recess which is caved in the direction of the central axis of the lens, wherein a distal end of the projection of said one of the first and second positioning portions abuts the recess of the other of the first and second positioning portions, wherein the second reflector comprises a third positioning portion disposed at a rearmost part of the second reflector, the positioning section of the light source mount comprises a fourth positioning portion, and the third positioning portion and the fourth positioning portion are engaged with each other, wherein one of the third and fourth positioning portions is introduced into the other of the third and fourth positioning portions, wherein said one of the third and fourth positioning portions comprises a projection, and the other of the third and fourth positioning portions comprises a recess which is caved in the direction of the central axis of the lens, and wherein a distal end of the projection of said one of the third and fourth positioning portions abuts the recess of the other of the third and fourth positioning portions.

10. The vehicle headlamp according to claim 9, further comprising:

a shade provided between the projection lens and the first semiconductor light emitting element, wherein the shade is operable to block off a part of light reflected from the first reflector to form a cutoff line in a light distribution pattern based on light passed through the projection lens, and wherein the shade is formed in a single structure with the projection lens, the first reflector, and the second reflector.

11. The vehicle headlamp according to claim 9, further comprising:

a first attachment having an first electric power feeding portion adapted to receive electric power, which causes the first semiconductor light emitting element to emit light, from an external power plug and to supply the electric power to the first contact; and a second attachment having a second electric power feeding portion adapted to receive electric power, which causes the second semiconductor light emitting element to emit light, from the external power plug and to supply the electric power to the second contact, wherein the first attachment is operable to laterally surround and hold the first LED unit in a state in which the bottom surface and a part of the side surface of the first heat radiating board is exposed, and in which a space above the first light emitting element is open, and wherein the second attachment is operable to laterally surround and hold the second LED unit in a state in which the bottom surface and a part of the side surface of the second heat radiating board is exposed, and in which a space above the second light emitting element is open.

12. The vehicle headlamp according to claim 9, further comprising:

a first attachment having an first electric power feeding portion adapted to receive electric power, which causes the first semiconductor light emitting element to emit light, from an external power plug and to supply the electric power to the first contact; and a second attachment having a second electric power feeding portion adapted to receive electric power, which causes the second semiconductor light emitting element to emit light, from the external power plug and to supply the electric power to the second contact, wherein the first attachment is operable to laterally surround and hold the first LED unit in a state in which the bottom surface and a part of the side surface of the first heat radiating board is exposed, and in which a space above the first light emitting element is open, and wherein the second attachment is operable to laterally surround and hold the second LED unit in a state in which the bottom surface and a part of the side surface of the second heat radiating board is exposed, and in which a space above the second light emitting element is open.

13. The vehicle headlamp according to claim 9, further comprising: a lamp body; and a cover which forms a chamber with the lamp body, wherein the projection lens, the first LED unit, the first reflector, the second LED unit, the second reflector, and the light source mount are housed in the chamber.

14. The vehicle headlamp according to claim 9, wherein the projection lens, the first reflector, and the second reflector are made of resin.

15. The vehicle headlamp according to claim 9, wherein the recesses are formed as cross-sectionally V-shaped grooves that extend in a horizontal direction respectively.

16. The vehicle headlamp according to claim 9, further comprising a connecting member formed as a molded part to be integral with the first reflector, wherein the projection lens is directly fixed to a front end portion of the connecting member.

* * * * *

UNITED STATES PATENT AND TRADEMARK OFFICE

CERTIFICATE OF CORRECTION

PATENT NO. : 7,665,872 B2
APPLICATION NO. : 11/698537
DATED : February 23, 2010
INVENTOR(S) : Masaaki Nakabayashi It is certified that error appears in the above-identified patent and that said Letters Patent is hereby corrected as shown below:

In Claim 3, Column 15, line 17, the words "to surround" should read --to laterally surround--.

Signed and Sealed this

Twenty-seventh Day of April, 2010

David J. Kappos
*Director of the United States Patent and Trademark Office*